US012196577B2

(12) United States Patent
Onimaru et al.

(10) Patent No.: US 12,196,577 B2
(45) Date of Patent: Jan. 14, 2025

(54) ROAD SURFACE EVALUATION APPARATUS AND ROAD SURFACE EVALUATION METHOD

(71) Applicant: Honda Motor Co., Ltd., Tokyo (JP)

(72) Inventors: Hiroyuki Onimaru, Tokyo (JP); Atsuki Kakinuma, Tokyo (JP); Akira Iihoshi, Tokyo (JP); Takeo Tokunaga, Tokyo (JP); Yasuo Oishi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 78 days.

(21) Appl. No.: 18/015,327

(22) PCT Filed: Jul. 2, 2021

(86) PCT No.: PCT/JP2021/025067
§ 371 (c)(1),
(2) Date: Jan. 10, 2023

(87) PCT Pub. No.: WO2022/014357
PCT Pub. Date: Jan. 20, 2022

(65) Prior Publication Data
US 2023/0273019 A1    Aug. 31, 2023

(30) Foreign Application Priority Data

Jul. 14, 2020 (JP) .................................. 2020-120567

(51) Int. Cl.
*G01C 7/04* (2006.01)
(52) U.S. Cl.
CPC ...................................... *G01C 7/04* (2013.01)

(58) Field of Classification Search
None
See application file for complete search history.

(56) References Cited

U.S. PATENT DOCUMENTS

| 8,972,192 B2 | 3/2015 | Bespalov et al. |
| 11,433,904 B2 * | 9/2022 | Magnusson .......... G08G 1/0141 |
| 2018/0195973 A1 * | 7/2018 | Yonekawa ............. G01B 11/30 |

(Continued)

FOREIGN PATENT DOCUMENTS

| CN | 112567437 A | * | 3/2021 | ............ B60W 40/09 |
| JP | H06129845 A | | 5/1994 | |

(Continued)

OTHER PUBLICATIONS

Machine translation (Year: 2021).*

(Continued)

*Primary Examiner* — Carlos Garcia
(74) *Attorney, Agent, or Firm* — Duft & Bornsen, PC

(57) ABSTRACT

A road surface evaluation apparatus includes a microprocessor and a memory connected to the microprocessor. The microprocessor is configured to perform: acquiring vehicle information including information indicating a motion of a vehicle while traveling and position information of the vehicle and map information including information on a road on which the vehicle is traveling, deriving roughness information indicating a roughness of road surface and a reliability of the roughness information based on the vehicle information, and outputting the roughness information and the reliability in association with the information on the road.

11 Claims, 8 Drawing Sheets

(56) References Cited

U.S. PATENT DOCUMENTS

| | | | | |
|---|---|---|---|---|
| 2018/0293372 A1* | 10/2018 | Gold | ................ | G06F 16/955 |
| 2022/0363288 A1* | 11/2022 | Kim | ................ | G06V 20/58 |
| 2023/0202501 A1* | 6/2023 | Onimaru | ................ | B60W 50/14 |
| | | | | 340/425.5 |
| 2023/0234602 A1* | 7/2023 | Onimaru | ................ | B60W 50/14 |
| | | | | 340/905 |
| 2023/0243113 A1* | 8/2023 | Kakinuma | ................ | E01C 23/01 |
| | | | | 702/167 |

FOREIGN PATENT DOCUMENTS

| | | | |
|---|---|---|---|
| JP | H1125389 A | | 1/1999 |
| JP | 2002012138 A | | 1/2002 |
| JP | 2013079889 A | * | 5/2013 |

OTHER PUBLICATIONS

Machine translation (Year: 2013).*
International Search Report; Application PCT/JP2021/025067; Aug. 10, 2021.
India office action; Application 202347008091; Mar. 26, 2024.

* cited by examiner

ROAD SURFACE EVALUATION APPARATUS AND ROAD SURFACE EVALUATION METHOD

CROSS-REFERENCE TO RELATED APPLICATION

This application is a National Stage of PCT international application Ser. No. PCT/JP2021/025067 filed on Jul. 2, 2021 which designates the United States, incorporated herein by reference, and which is based upon and claims the benefit of priority from Japanese Patent Application No. 2020-120567, filed on Jul. 14, 2020, the entire contents of which are incorporated herein by reference.

TECHNICAL FIELD

This invention relates to a road surface evaluation apparatus and a road surface evaluation method that evaluate a road surface profile representing unevenness of a road surface.

BACKGROUND ART

As a prior-art apparatus of this type, it is known that a road surface profile representing the unevenness of the road surface on which a vehicle has traveled is detected based on the acceleration in the lateral direction (lateral to the traveling direction) measured by an acceleration sensor installed in the vehicle (see, for example, Patent Literature 1).

CITATION LIST

Patent Literature

Patent Literature 1: Japanese Unexamined Patent Publication No. 2002-12138

DISCLOSURE OF INVENTION

Problems to be Solved by the Invention

However, the road surface profile detected based on the acceleration measured by the acceleration sensor will vary depending on various factors such as the position of the tires on the road surface while traveling and weather conditions. Therefore, simply detecting the road surface profile based on the acceleration measured by the acceleration sensor, as in the apparatus described in Patent Literature 1 above, does not sufficiently evaluate the road surface profile.

Means for Solving Problem

An aspect of the present invention is a road surface evaluation apparatus including: a vehicle information acquisition unit configured to acquire vehicle information including information indicating a motion of a vehicle while traveling and position information of the vehicle; a map information acquisition unit configured to acquire map information including information on a road on which the vehicle is traveling; a roughness information derivation unit configured to derive roughness information indicating a roughness of road surface and a reliability of the roughness information based on the vehicle information acquired by the vehicle information acquisition unit; and an output unit configured to output the roughness value and reliability derived by the roughness information derivation unit in association with the information on the road acquired by the map information acquisition unit.

Another aspect of the present invention is a road surface evaluation method including: causing a computer to execute steps of: acquiring vehicle information including information indicating a motion of a vehicle while traveling and position information of the vehicle; acquiring map information including information on a road on which the vehicle is traveling; deriving roughness information indicating a roughness of road surface and a reliability of the roughness information based on the acquired vehicle information acquired; and outputting the derived roughness information and the reliability in association with the acquired information on the road.

Effect of the Invention

The present invention allows adequate evaluation of road surface profiles.

DESCRIPTION OF EMBODIMENT

Figure 1:
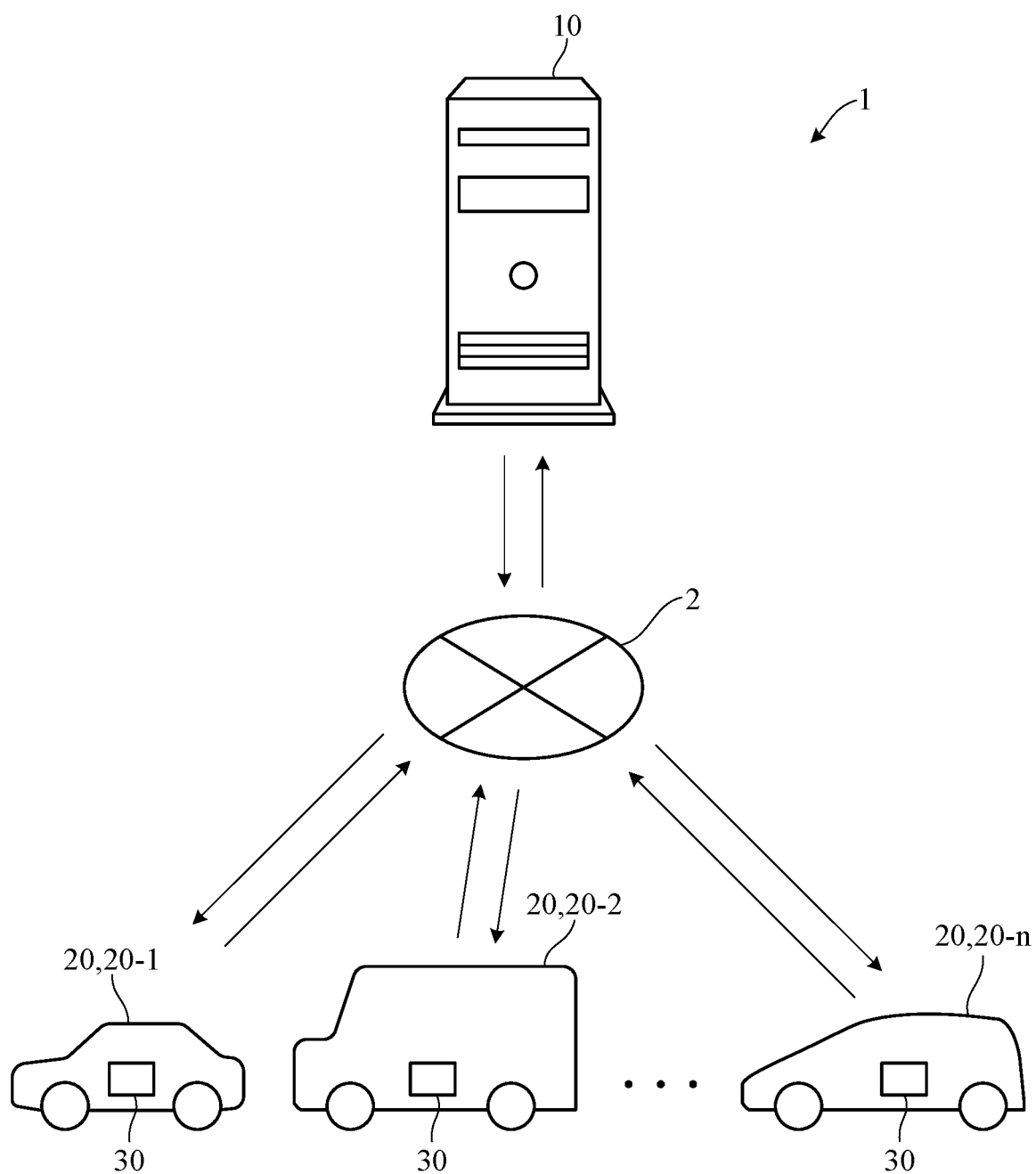
FIG. 1 is a diagram illustrating an example of a configuration of a road surface evaluation system including a road surface evaluation apparatus according to an embodiment of the present invention.

An embodiment of the present invention will be described below with reference to FIGS. 1 to 8. The road surface evaluation apparatus according to the present embodiment is an apparatus for evaluating the road surface profile of a road on which a vehicle is traveling. FIG. 1 illustrates an example of the configuration of a road surface evaluation system including a road surface evaluation apparatus according to the present embodiment. As illustrated in FIG. 1, the road surface evaluation system 1 includes a road surface evaluation apparatus 10 and an in-vehicle device 30. The road surface evaluation apparatus 10 is configured as a server device. The in-vehicle device 30 is configured to communicate with the road surface evaluation apparatus 10 via a communication network 2.

The communication network 2 includes not only public wireless communication networks represented by Internet networks and cell phone networks, but also closed communication networks established for each predetermined administrative region, such as wireless LAN, Wi-Fi (registered trademark), and Bluetooth (registered trademark).

The in-vehicle device 30 is installed in various types of vehicle 20. The vehicle includes various vehicles 20-1, 20-2, . . . , 20-$n$ having different vehicle widths. For example, the vehicle 20-1 is a sedan, the vehicle 20-2 is a one-box car having a larger vehicle width than the vehicle 20-1, and the vehicle 20-$n$ is a minivan having a larger vehicle width than the vehicle 20-1 and a smaller vehicle width than the vehicle 20-2. The vehicle 20 may be a manual driving vehicle or a self-driving vehicle.

Figure 2:
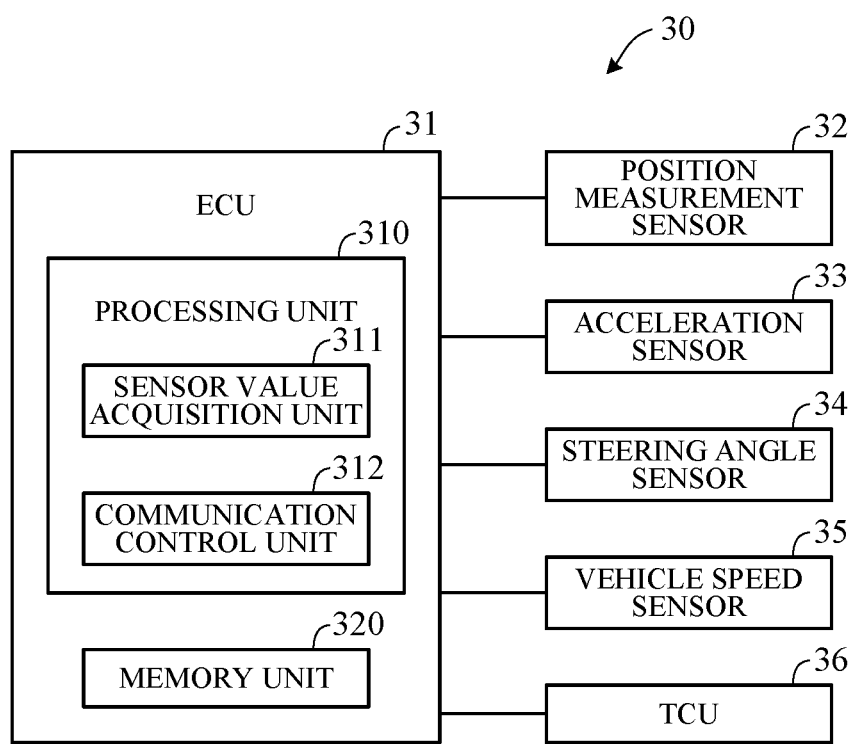
FIG. 2 is a block diagram illustrating key components of an in-vehicle device.

FIG. 2 is a block diagram illustrating the key components of the in-vehicle device according to the present embodiment. The in-vehicle device 30 has an electronic control unit (ECU) 31, a position measurement sensor 32, an acceleration sensor 33, a steering angle sensor 34, a vehicle speed sensor 35, and a telematic control unit (TCU) 36.

The position measurement sensor 32 is, for example, a GPS sensor, which receives positioning signals transmitted from GPS satellites and detects the absolute position (e.g., latitude and longitude) of the vehicle 20. The position measurement sensor 32 includes not only GPS sensors but also sensors that use radio waves transmitted from satellites in various countries, known as GNSS satellites, including quasi-zenith orbit satellites. Alternatively, the vehicle position may be determined by a hybrid method with inertial navigation.

The acceleration sensor 33 detects the acceleration of the vehicle 20 in the left-right directions, that is, lateral acceleration. The acceleration sensor 33 may be configured to detect acceleration in the front-back direction and vertical direction as well as lateral acceleration of the vehicle 20. The steering angle sensor 34 detects the steering angle of the steering wheel (not shown) of the vehicle 20. The vehicle speed sensor 35 detects the vehicle speed of the vehicle 20.

As illustrated in FIG. 2, the ECU 31 includes a computer including a processing unit 310 such as a CPU, a memory unit 320 such as ROM and RAM, and other peripheral circuits such as I/O interfaces not illustrated. The processing unit 310 functions as a sensor value acquisition unit 311 and a communication control unit 312 by executing a program stored in the memory unit 320 in advance.

The sensor value acquisition unit 311 acquires information (values) detected by each of the sensors 32 to 35, that is, vehicle information. The sensor value acquisition unit 311 acquires vehicle information including the acceleration of the vehicle 20 detected by the acceleration sensor 33 and the absolute position of the vehicle 20 detected by the position measurement sensor 32 at a predetermined cycle, for example, every 10 ms. The vehicle information includes at least the lateral acceleration of the vehicle 20 detected at least by the acceleration sensor 33. The communication control unit 312 transmits the vehicle information acquired by the sensor value acquisition unit 311 to the road surface evaluation apparatus 10 at a predetermined cycle via a TCU 36. More specifically, the communication control unit 312 sends the vehicle information acquired by the sensor value acquisition unit 311 in intervals of, for example, 1 s so as not to increase the processing load and not to unnecessarily squeeze the bandwidth of the communication network 2.

The road surface evaluation apparatus 10 detects unevenness of the road surface, or road surface profile, based on the detected values by the acceleration sensor 33 included in the vehicle 20. The detected road surface profile is output to a terminal owned by, for example, a road management company, and is used as reference data by the road management company when considering whether or not repairs are necessary. Specifically, the detected values of the acceleration sensor are used to evaluate the road surface profile.

However, as described above, the road surface profile detected based on the acceleration measured by the acceleration sensor of the vehicle will vary. Therefore, it is difficult to adequately evaluate the road surface profile with the road surface profile detected based on the acceleration sensor included in the vehicle 20. Therefore, in the present embodiment, the road surface evaluation apparatus is configured as follows so that the road surface profile can be adequately evaluated.

Figure 3:
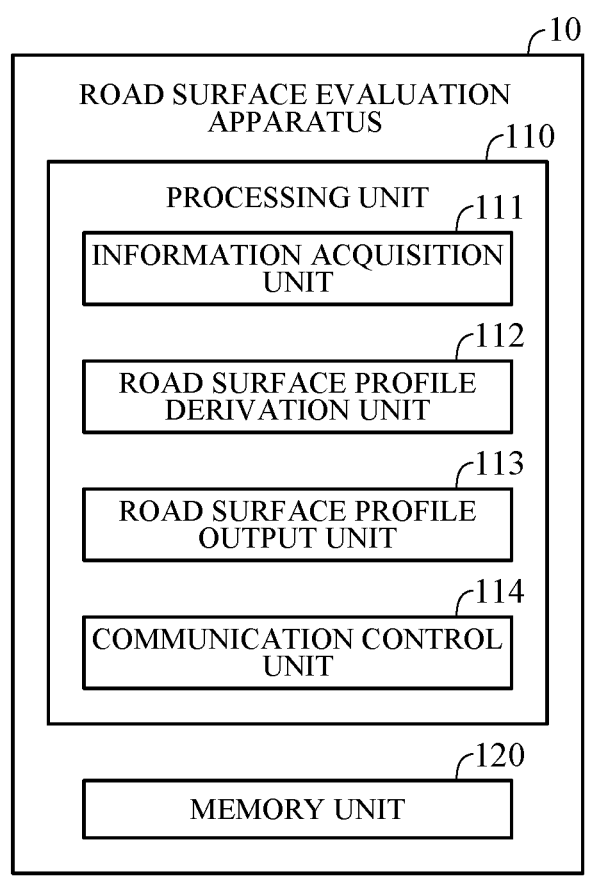
FIG. 3 is a block diagram illustrating key components of the road surface evaluation apparatus according to the embodiment of the present invention.

FIG. 3 is a block diagram illustrating the key components of the road surface evaluation apparatus 10 according to the present embodiment. The road surface evaluation apparatus 10 is configured to include a computer including a processing unit 110, such as a CPU, a memory unit 120 such as ROM and RAM, and other peripheral circuits such as I/O interfaces not illustrated. The memory unit 120 stores map information including road maps, and various information processed by the processing unit 110.

The processing unit 110 functions as an information acquisition unit 111, a road surface profile derivation unit 112, a road surface profile output unit 113, and a communication control unit 114 by executing programs stored in the memory unit 120.

The information acquisition unit 111 acquires information indicating the motion of the vehicle 20, which includes acceleration of the vehicle 20 in each direction, and vehicle information including the position information of the vehicle 20. The information acquisition unit 111 receives vehicle information from the in-vehicle device 30 of the vehicle 20 traveling on the road via the communication control unit 114. The information acquisition unit 111 stores the acquired vehicle information in time series in the memory unit 120. Information indicating the motion of the vehicle 20 is a mixture of information indicating the roll motion of the vehicle, information indicating the motion due to centrifugal force, and information indicating the motion due to road surface unevenness.

The information acquisition unit 111 acquires map information from the memory unit 120, including information on the road on which the vehicle 20 is traveling.

The road surface profile derivation unit 112 derives roughness information indicating the amount of unevenness (depth or height) of the road surface, or road surface roughness, based on the vehicle information acquired by the information acquisition unit 111. More specifically, the road surface profile derivation unit 112 derives road surface roughness information by machine learning based on vehicle information acquired by the information acquisition unit 111. Roughness information is a road surface roughness value that indicates the degree of roughness of the road surface, for example, the value expressed by the International Roughness Index (IRI), which is an international index. Hereinafter, the road surface roughness values may be simply referred to as roughness values.

In general, the greater the amount of unevenness of the road surface, the greater the lateral acceleration of the vehicle 20, and the road surface roughness value and lateral acceleration have a certain correlation. The road surface profile derivation unit 112 uses this correlation to derive the road surface roughness value corresponding to the vehicle position on the road from the lateral acceleration. Specifically, the road surface profile derivation unit 112 first executes machine learning using previously measured road surface roughness values and lateral acceleration as training data to derive the correlation between road surface roughness values and lateral acceleration.

Figure 4A:
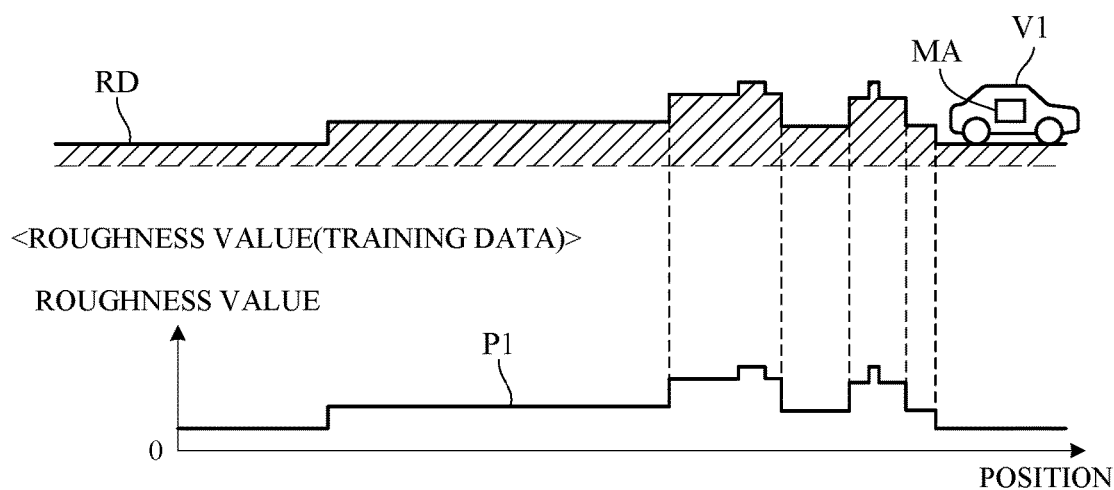
FIG. 4A is a diagram illustrating training data of road surface roughness value.
Figure 4B:
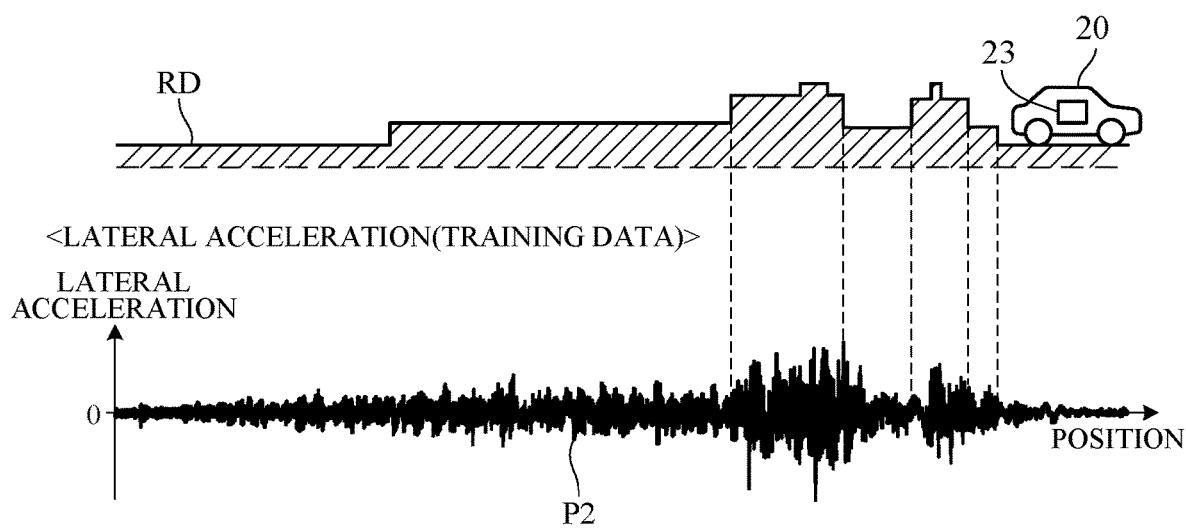
FIG. 4B is a diagram illustrating training data of lateral acceleration.

FIGS. 4A and 4B illustrate the training data for road surface roughness values and lateral acceleration, respectively. A vehicle V1 illustrated in FIG. 4A is a dedicated vehicle including a measuring instrument MA to measure road surface roughness. The measuring instrument MA measures the road surface roughness values of the road RD when the vehicle V1 is traveling on a predetermined road (such as a course for measurement) RD. A characteristic P1 in FIG. 4A represents the road surface roughness values measured at this time.

FIG. 4B illustrates the vehicle 20 in FIG. 1 traveling on the same road RD as that in FIG. 4A. A characteristic P2 in FIG. 4B indicates the lateral acceleration detected every 10 ms by the acceleration sensor 33 installed in the vehicle 20 while the vehicle 20 is traveling on the predetermined road RD. The characteristic P1 in FIG. 4A and P2 in FIG. 4B are used as training data when the road surface profile derivation unit 112 derives the correlation between road surface roughness values and lateral acceleration, respectively.

The data for characteristics P1 and P2, that is, the training data for road surface roughness values and lateral acceleration, may be stored in the memory unit 120 of the road surface evaluation apparatus 10 or in an external storage device. When deriving the correlation between road surface roughness values and lateral acceleration, the road surface profile derivation unit 112 reads each training data from the memory unit 120 or an external storage device. The road surface profile derivation unit 112 may derive the correlation between road surface roughness values and lateral acceleration from the training data of road surface roughness values and lateral acceleration in advance, and store the derived correlation information in the memory unit 120 or the like. The road surface profile derivation unit 112 may also execute machine learning by adding traveling speed, acceleration in the front/rear direction, and steering angle as training data.

The road surface profile derivation unit 112 uses the correlation between the road surface roughness values and the lateral acceleration to derive the road surface roughness values of the road on which the vehicle 20 has traveled based on the vehicle information of the vehicle 20 stored in time series in the memory unit 120. Hereafter, the vehicle information stored in time series in the memory unit 120 is referred to as time-series vehicle information.

Figure 5A:
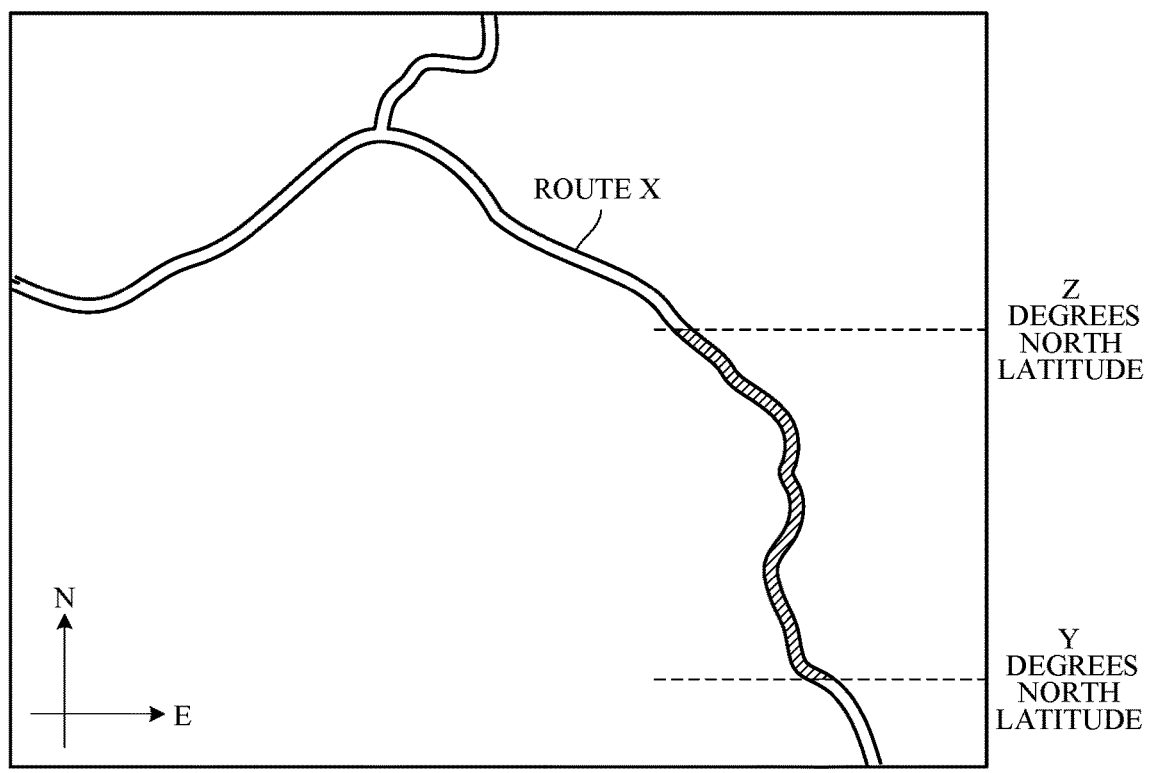
FIG. 5A is a diagram illustrating an example of a map of a road on which a vehicle is traveling.
Figure 5B:
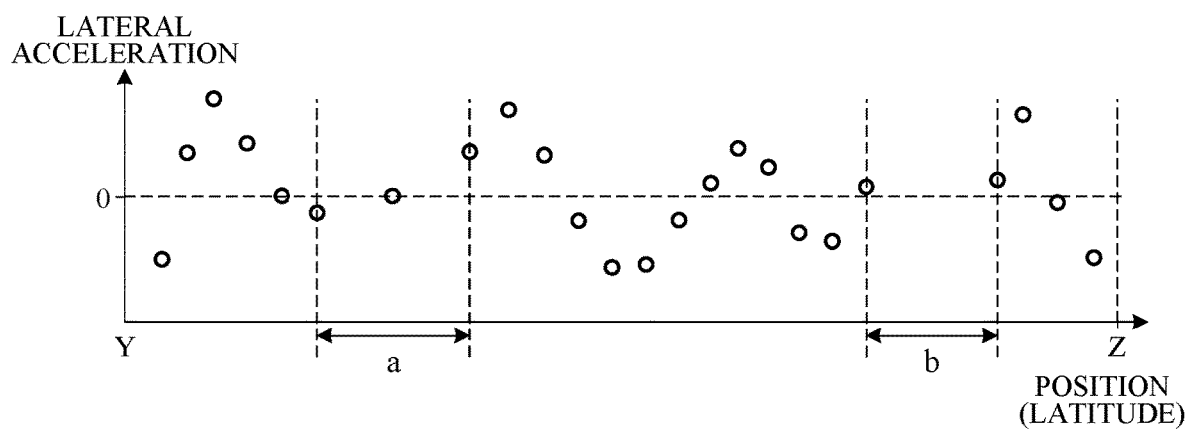
FIG. 5B is a diagram illustrating an example of vehicle information acquired by the road surface evaluation apparatus from the in-vehicle device of the vehicle that traveled the road in FIG. 5A.

FIG. 5A illustrates an example of a map of the road on which the vehicle 20 is traveling. FIG. 5A illustrates the predetermined range (the section from latitude Y to Z on National Route X) from which the road surface roughness values are derived. In FIG. 5A, the upper direction corresponds to the north direction, and the right direction corresponds to the east direction. The range of road surface roughness values to be derived can be specified by the user as described below. When the road to be used for deriving road surface roughness values has a plurality of lanes on each side, the user specifies the lanes to be used for deriving road surface roughness values. FIG. 5B illustrates an example of time-series vehicle information acquired by the road surface evaluation apparatus 10 from the in-vehicle device 30 of the vehicle 20 that traveled the predetermined range (the section of latitude Y to Z on National Route X) in FIG. 5A. The horizontal axis in the figure is the position (latitude) of the vehicle 20 in the traveling direction along the traveling lane, and the vertical axis is the lateral acceleration of the vehicle 20.

The communication control unit 312 of the in-vehicle device 30 transmits vehicle information every predetermined time (1 second in the present embodiment). Therefore, as illustrated in FIG. 5B, the time-series vehicle information for the vehicle 20 is discrete, resulting in sections with little information. For example, as the vehicle 20 travels faster, the distance from the point where the vehicle information is transmitted last time to the point where the vehicle information is transmitted next becomes longer, as in the section a in the figure, and the amount of information becomes less. When the road has a plurality of lanes on each side, lane changes and other such events will also cause sections (section b in the figure) where vehicle information is not transmitted. The section b is the section where the vehicle 20 traveled in a lane other than the lane specified as the target for deriving road surface roughness values.

For sections where the amount of vehicle information is small or vehicle information is not transmitted, the road surface profile derivation unit 112 estimates the road surface roughness values using the vehicle information previously obtained from the in-vehicle device 30 of the same vehicle 20 in that section. In addition, the road surface profile derivation unit 112 estimates the road surface roughness values for the section using the vehicle information acquired from the in-vehicle device 30 of the other vehicle 20 in the section. Furthermore, the road surface profile derivation unit 112 estimates the road surface roughness values for the section for which no vehicle information is obtained from any vehicle 20, based on the vehicle information acquired behind and in front of that section.

However, when vehicle information acquired in the past from the same vehicle or vehicle information acquired from other vehicles is used to estimate road surface roughness values, the vehicle information will vary depending on the position of the tires, weather conditions, and other factors while the vehicle is traveling. For example, the vehicles 20-1, 20-2, and 20-n in FIG. 1 each have different vehicle widths, so the tires at which road surface roughness values are detected are different. As a result of this, even when the vehicles 20-1, 20-2, and 20-n travel on the same road, there will be variations in the vehicle information acquired from the in-vehicle devices 30 of these vehicles. When such a variation occurs, the estimation accuracy of the road surface roughness value fluctuates, and the estimation accuracy decreases as the variation increases.

In consideration of this point, the road surface profile derivation unit 112 is configured to estimate road surface roughness values by machine learning. More specifically, the road surface profile derivation unit 112 estimates road surface roughness values using an interpolation algorithm that uses a Gaussian process which is a Bayesian learning method. The reason for using a Gaussian process is that a Gaussian process provides the estimated accuracy (reliability) of the value as well as the estimated value.

The road surface profile output unit 113 outputs the road surface roughness values derived by the road surface profile derivation unit 112 and their reliability, associated with the information on the road acquired by the information acquisition unit 111.

The communication control unit 114 controls a communication unit (not illustrated) to send and receive data to and from external devices and others. More specifically, the communication control unit 114 transmits and receives data via the communication network 2 to and from the in-vehicle device 30 of the vehicle 20 and terminals of road management companies or the like. The communication control unit 114 also receives, via the communication network 2, a road surface profile output instruction described below from the terminals of road management companies or the like. In addition, the communication control unit 114 acquires map information and other information from various servers connected to the communication network 2 periodically or at arbitrary times. The communication control unit 114 stores the information acquired from the various servers in the memory unit 120.

Figure 6:
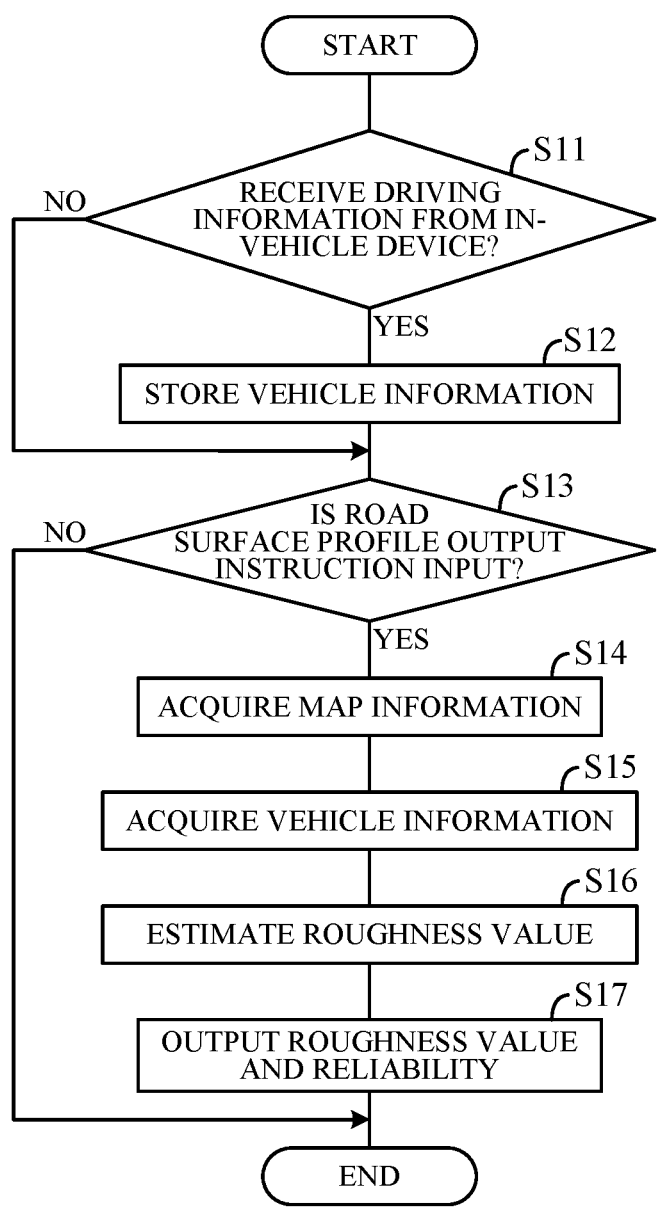
FIG. 6 is a diagram illustrating an example of processing executed by the processing unit in FIG. 3.

FIG. 6 is a flowchart illustrating an example of processing executed by the processing unit 110 (CPU) of the road surface evaluation apparatus 10 according to a predetermined program. The processing illustrated in this flowchart is repeated at a predetermined cycle while the road surface evaluation apparatus 10 is running. First, in step S11, it is determined whether vehicle information has been received from the in-vehicle device 30 of the vehicle 20. If NO in step S11, the processing proceeds to step S13. If YES in step S11, in step S12, the vehicle information received in step S11 is stored in the memory unit 120.

In step S13, it is determined whether or not a road surface profile output instruction has been input (received). The road surface profile output instruction is, for example, sent to the road surface evaluation apparatus 10 from a terminal of the user (for example, road management company) via the communication network 2. The road surface profile output instruction may be input to the road surface evaluation apparatus 10 via an operation unit (not illustrated) included in the road surface evaluation apparatus 10.

The road surface profile output instruction includes road section information that can identify the road section to be output. The section information is information that indicates the name and section of the road to be output, for example, "road: National Route X, section: latitude Y to Z". When the road has a plurality of lanes on each side, such as two lanes on one side, the section information may include information on the lane to be output, such as "road: National Route X, lane: right end, section: latitude Y to Z". Information other than latitude may be used to specify the section to be output. For example, longitude may be used instead of latitude or in addition to latitude. Alternatively, the distance from the start point coordinates may also be used.

If NO in step S13, the processing ends. If YES in step S13, in step S14, map information is read from the memory unit 120 and information on roads included in the map information is acquired. In step S15, the time-series vehicle information of the vehicle 20 is acquired from the memory unit 120. More specifically, based on the section information included in the road surface profile output instruction and the information on the road acquired in step S14, the time-series vehicle information for the section to be output, which are stored in the memory unit 120, are acquired from the memory unit 120.

In step S16, based on the correlation between the road surface roughness values and lateral acceleration derived in advance and the time-series vehicle information of the vehicle 20 acquired in step S15, the road surface roughness values of the section to be output is estimated using an interpolation algorithm using a Gaussian process. The reliability of the value is then acquired together with the estimated road surface roughness value.

Finally, in step S17, the road surface roughness values estimated (derived) in step S16 and their reliability are output in association with the information on the road acquired in step S14. More specifically, based on the information on the road acquired in step S14, the road surface roughness values estimated in step S16 and their reliability are associated with each location in the section to be output. Hereinafter, the information output at this time is referred to as road surface profile information. The road surface profile information is output to the terminal from which the road surface profile output instructions are sent via the communication network 2 or to a predetermined output destination terminal, so that it can be displayed in the manner illustrated in FIG. 7. This allows the road surface profile information to be displayed on a display device such as a monitor, making it easier for the user to check and evaluate the road surface profile information. Even if NO in step S13, when the time-series vehicle information for the vehicle 20 stored in the memory unit 120 that has not been output have accumulated more than a predetermined amount, the processing may proceed to step S14. Even if YES in step S13, the processing may end when the time-series vehicle information for the vehicle 20 stored in the memory unit 120 that has not been output are less than a predetermined amount. At that time, information (text information, voice information, or image information) to notify that the time-series vehicle information that has not been output is less than a predetermined amount may be output to the terminal or other device from which the road surface profile output instructions were sent.

Figure 7:
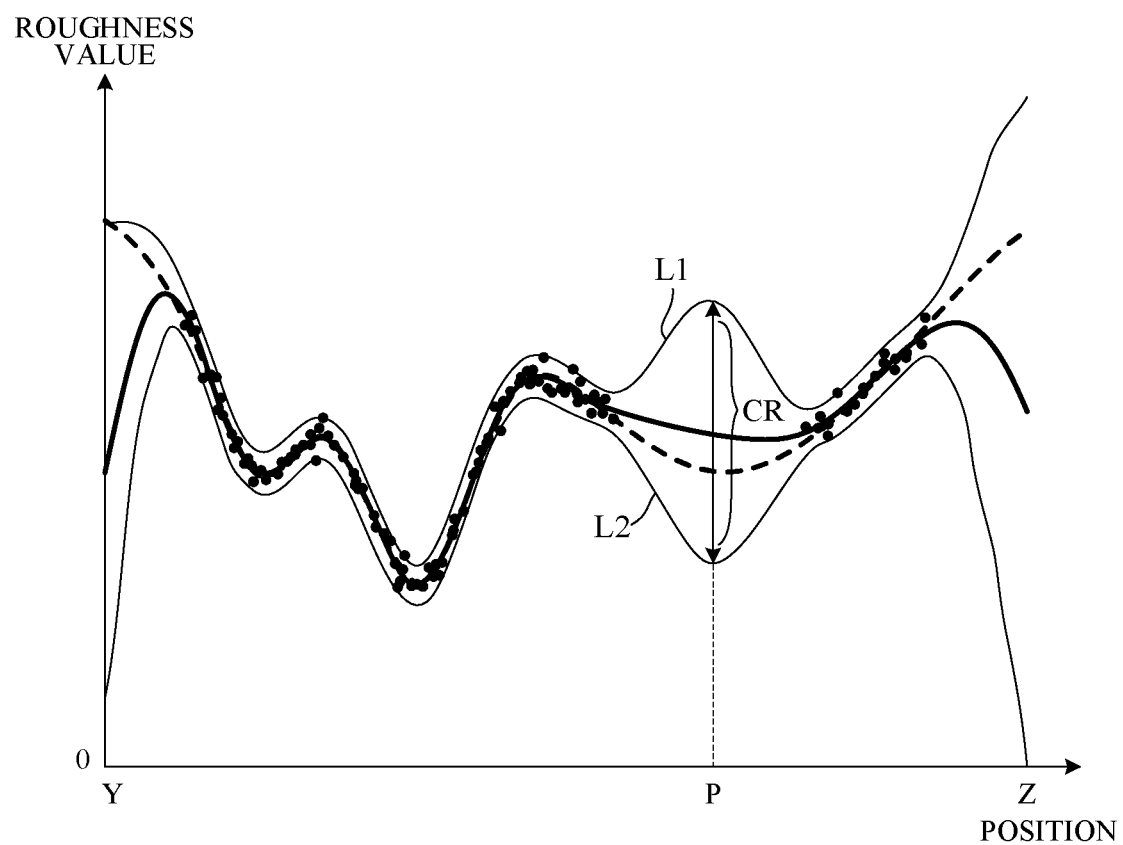
FIG. 7 is a diagram illustrating an example of information output by the road surface profile output unit in FIG. 3.

FIG. 7 illustrates an example of road surface profile information output by the road surface profile output unit 113. In FIG. 7, the vertical axis represents the road surface roughness value, and the horizontal axis represents the position of the vehicle 20. The dashed line indicates the road surface roughness values estimated by the road surface profile derivation unit 112 (referred to as an estimated roughness value). The solid line represents the actual road surface roughness values (referred to as the actual roughness values). The actual roughness values are not included in the road surface profile information, but are illustrated in the figure for illustration.

The region sandwiched between lines L1 and L2 indicates the reliability of the estimated roughness value at each location; for example, the vertical width CR at a point P represents the reliability of the estimated roughness value at the point P. In the example illustrated in FIG. 7, the width CR is the 2σ confidence interval when the estimated roughness values have a Gaussian distribution, and represents that the estimated roughness value at the point P falls within that range with approximately 95% probability. That is, the narrower the width CR, the higher the accuracy of the estimated roughness value at that point.

Figure 8:
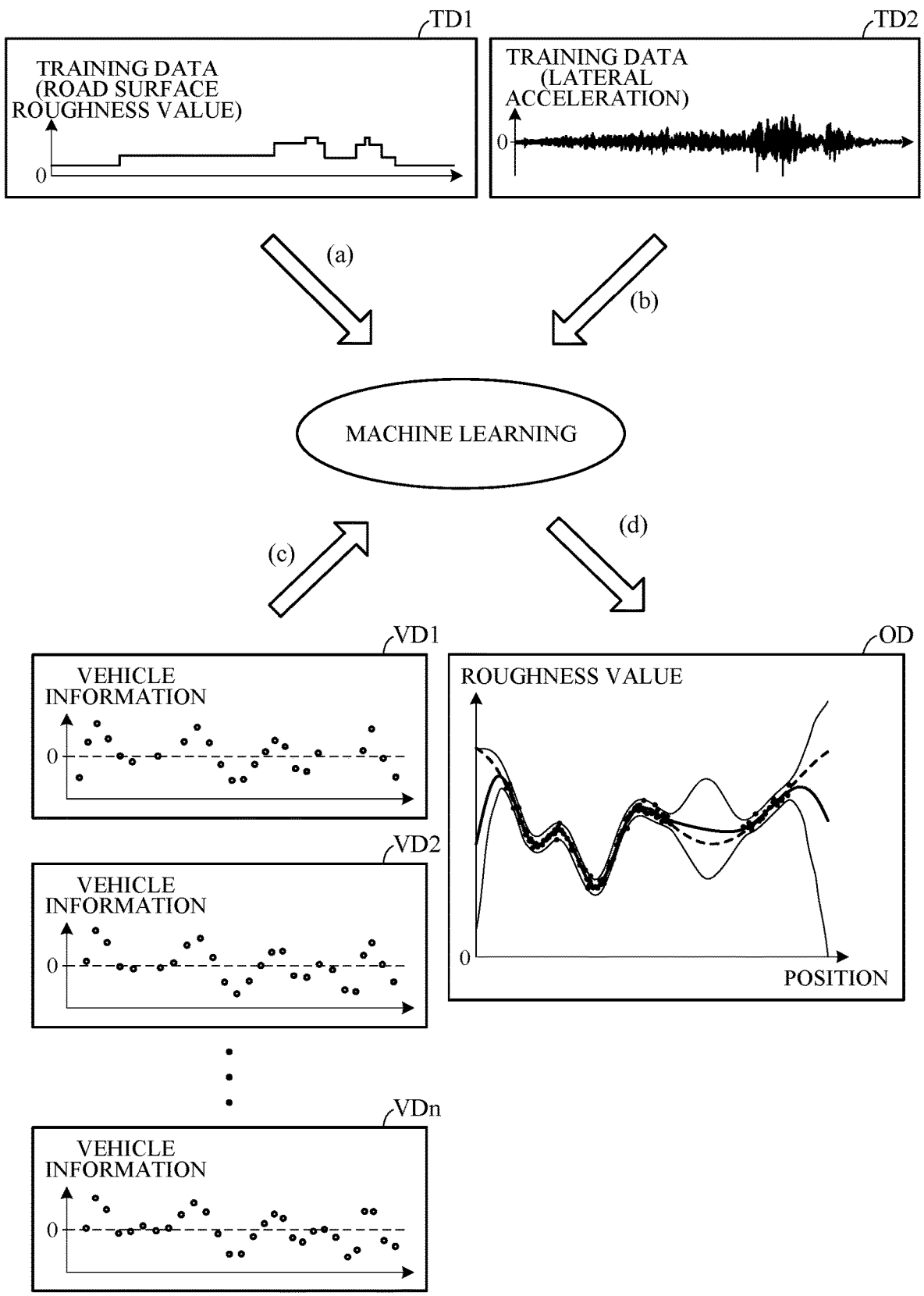
FIG. 8 is a diagram for explaining data processing in the road surface evaluation apparatus according to the embodiment of the present invention.

Data processing in the road surface evaluation apparatus 10 according to the present embodiment can be summarized as follows. FIG. 8 illustrates data processing in the road surface evaluation apparatus 10 according to the present embodiment. First, a correlation between road surface roughness values and lateral acceleration is derived in advance by machine learning based on the training data TD1 of road surface roughness values and the training data TD2 of lateral acceleration ((a), (b)).

When the road surface profile output instruction is input, the road surface roughness values and their reliabilities are estimated for the roads traveled by each vehicle based on the correlation between the road surface roughness values and lateral acceleration and the time-series vehicle information VD1 to VDn for the vehicles 20-1 to 20-$n$ ((c)). Finally, the estimated road surface roughness values and their reliability are output as information OD in association with the information on the road included in the map information read from the memory unit 120 ((d)).

According to the embodiment of the present invention, the following effects can be achieved.

(1) A road surface evaluation apparatus 10 includes: an information acquisition unit 111 that acquires vehicle information including information indicating the motion of a vehicle 20 while traveling and the position information of the vehicle 20, and map information including information on the road on which the vehicle 20 is traveling; a roughness road surface profile derivation unit 112 that derives roughness information indicating the roughness of the road surface on which the vehicle 20 traveled and the reliability of the roughness information, based on the vehicle information of the vehicle 20 acquired by the information acquisition unit 111; and a road surface profile output unit 113 that outputs the roughness information and reliability derived by the road surface profile derivation unit 112 in association with the information on the road acquired by the information acquisition unit 111 (FIG. 3). This configuration allows adequate evaluation of the road surface profile. Furthermore, the evaluation results can be presented to uses such as road management companies, allowing the users to estimate roads in need of repair without having to visit the site, thereby reducing the cost of road management.

(2) The roughness information is a roughness value indicating the degree of roughness of the road surface, and the reliability of the roughness information (roughness value) is represented by a range of roughness values derived by the road surface profile derivation unit 112 based on the vehicle information acquired by the information acquisition unit 111. This allows recognition of the accuracy of the roughness information (roughness values) derived by the road surface profile derivation unit 112 and more sufficient evaluation of the road surface profile.

(3) The road surface profile output unit 113 outputs displayable information that associates the roughness information and reliability derived by the road surface profile derivation unit 112 with the information on the road acquired by the information acquisition unit 111. This allows users to visually recognize the road surface profile and easily estimate which roads need to be repaired.

(4) The road surface profile derivation unit 112 derives the roughness information and the reliability of the roughness information at each location on the road traveled by the vehicle by machine learning using a Gaussian process. This allows derivation of roughness information and the reliability of the roughness information for each location on the road traveled by the vehicle 20, even when the vehicle information acquired by the information acquisition unit 111 is discrete information.

(5) When the vehicle information corresponding to the third point between the first and second points is not acquired by the information acquisition unit 111, the road surface profile derivation unit 112 derives the roughness information and the reliability of the roughness information at the third point using the vehicle information corresponding to the first point and the second point by the interpolation. This allows derivation of roughness information and the reliability of the roughness information even for sections of the road traveled by the vehicle for which vehicle information has not been acquired by the information acquisition unit 111.

(6) The road surface evaluation apparatus 10 of the present embodiment can also be used as a road surface evaluation method. The road surface evaluation method includes having a computer execute the steps of: acquiring vehicle information including information indicating the motion of a vehicle 20 while traveling and the position information of the vehicle 20 (step S15); acquiring map information including information on the road on which the vehicle is traveling (step S14); deriving roughness information indicating the roughness of the road surface and the reliability of the roughness information based on the acquired vehicle information (step S16); and outputting the derived roughness information and reliability in association with the acquired information on the road (step S17) (FIG. 6). This configuration allows adequate evaluation of the road surface profile.

The above embodiment can be modified into various forms. Hereinafter, modifications will be described. In the above embodiment, the information acquisition unit 111 acquires the lateral acceleration of the vehicle 20 detected by the acceleration sensor 33 as information indicating the motion of the vehicle 20 as the vehicle information acquisition unit, but the information indicating the motion of vehicle 20 is not limited to the lateral acceleration of the vehicle 20 detected by the acceleration sensor. In other words, any configuration of the information acquisition unit 111 may be used, such as that using an acceleration sensor to detect the front/rear acceleration of the vehicle 20, as long as it acquires information indicating the motion of the vehicle 20.

In the above embodiment, the information acquisition unit 111 functions as a map information acquisition unit to acquire map information from the memory unit 120, including information on the road on which the vehicle 20 is traveling, but the map information may be stored on an external server or external storage device. In other words, any configuration of the map information acquisition unit 111 may be used as long as map information acquisition unit 111 acquires map information that includes information on the road on which the vehicle 20 is traveling.

The road surface profile derivation unit 112 may also correct the derived road surface roughness values based on the vehicle speed detected by the vehicle speed sensor 35 and the steering angle detected by a steering angle sensor 34. When the vehicle 20 travels on a curved road, the acceleration sensor 33 detects not only the lateral acceleration generated by the unevenness of the road surface, but also the lateral acceleration due to centrifugal force generated by the traveling speed and steering angle of the vehicle 20. Therefore, in such a case, the road surface profile derivation unit 112 may correct the road surface roughness values to eliminate the component based on lateral acceleration due to centrifugal force from the road surface roughness values derived based on the lateral acceleration detected by the acceleration sensor 33. This allows adequate evaluation of road surfaces other than straight lines. The road surface profile derivation unit 112 may correct the road surface roughness values by executing the above machine learning with the addition of traveling speed, acceleration in the front/rear direction, and steering angle as training data.

In the above embodiment, the road surface profile derivation unit 112 functioned as a roughness information derivation unit and executed machine learning using previously measured road surface roughness values and lateral acceleration as training data to derive the correlation between road surface roughness values and lateral acceleration. However, the roughness information derivation unit may generate an equation or table indicating the correlation between roughness values and lateral acceleration based on previously measured roughness values and lateral acceleration without using machine learning. The roughness information derivation unit may then use that equation or table to derive the road surface roughness values and their reliability.

In other words, any configuration of the roughness information derivation unit may be used as long as the roughness information derivation unit derives the road surface roughness values and their reliability.

In the above embodiment, the road surface profile output unit 113 functions as an output unit to output the road surface profile information so that the road surface profile information can be displayed in the manner illustrated in FIG. 7, but the road surface profile information may be output in other embodiment, such as in which the roughness values and reliabilities are mapped to the roads on the map. More specifically, the road surface profile information may be output in such a manner that the roads on the map are displayed in colors and widths according to roughness values and their reliability. That is, any configuration of the output unit may be used as long as the output unit outputs the road surface profile information in a manner that the road surface roughness values and their reliability are recognizable to the user.

In the above embodiment, the road surface roughness values are expressed in terms of IRI, but the road surface roughness values may be expressed in terms of other indices. For example, if the road surface roughness values acquired as training data are represented in terms of an index other than IRI, the road surface profile derivation unit 112 may derive the road surface roughness values represented by that index.

Furthermore, when there is a road (section) whose reliability estimated in step S13 is lower than a predetermined value, the road surface profile output unit 113 may transmit, via the communication control unit 114, traveling request information to the vehicle 20 such that the vehicle 20 is requested to travel on that road. At that time, the road surface profile output unit 113 may send the traveling request information not to all the vehicles 20, but to the vehicles 20 within a predetermined distance (for example, within 1 km) from the road where the reliability of the road surface roughness values is lower than the predetermined value. In addition, incentives may be offered to users of the vehicles 20 that have traveled on the roads specified by the traveling request information. This can increase the reliability of the roughness values derived by the road surface profile derivation unit 112.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LIST 10 road surface evaluation apparatus, 20, 20-1 to 20-$n$ vehicle, 30 in-vehicle device, 110 processing unit, 111 information acquisition unit, 112 road surface profile derivation unit (roughness information derivation unit), 113 road surface profile output unit (output unit), 120 memory unit

The invention claimed is:

1. A road surface evaluation apparatus, comprising:
a microprocessor and a memory connected to the microprocessor, wherein
the microprocessor is configured to perform:
acquiring vehicle information including information indicating a motion of a vehicle while traveling and position information of the vehicle and map information including information on a road on which the vehicle is traveling;
deriving roughness information indicating a roughness of a road surface and a reliability of the roughness information based on the vehicle information; and
outputting the roughness information and the reliability in association with the information on the road so that the narrower a width of an area representing the reliability of the roughness information, the higher an accuracy of the roughness information.

2. The road surface evaluation apparatus according to claim 1, wherein
the roughness information is a roughness value indicating a degree of roughness of the road surface, and the reliability of the roughness information is represented by a range of the roughness value based on the vehicle information.

3. The road surface evaluation apparatus according to claim 1, wherein
the microprocessor is configured to perform
the outputting including outputting displayable information associating the roughness information and the reliability with the road information.

4. The road surface evaluation apparatus according to claim 1, wherein
the microprocessor is configured to perform
the deriving including deriving the roughness information and the reliability at each position on the road on which the vehicle is traveling by machine learning using a Gaussian process.

5. The road surface evaluation apparatus according to claim 1, wherein
the microprocessor is configured to perform,
when the vehicle information corresponding to a third point between a first point and a second point is not acquired, the deriving including deriving the roughness information and the reliability at the third point using the vehicle information corresponding to the first point and the second point by an interpolation.

6. The road surface evaluation apparatus according to claim 1, wherein
the microprocessor is configured to perform
the deriving including correcting the roughness information to eliminate a component based on a lateral acceleration due to a centrifugal force from the roughness information derived based on a traveling speed and a steering angle indicated by the vehicle information.

7. The road surface evaluation apparatus according to claim 1, wherein
the vehicle information includes a lateral acceleration, traveling speed, front/rear acceleration and steering angle of the vehicle as the information indicating the motion of the vehicle.

8. The road surface evaluation apparatus according to claim 1, wherein
the microprocessor is configured to perform
the outputting including outputting traveling request information to the vehicle such that the vehicle is requested to travel on the road where the reliability is lower than a predetermined value.

9. The road surface evaluation apparatus according to claim 8, wherein
the microprocessor is configured to perform
the outputting including outputting the traveling request information to the vehicle within a predetermined distance from the road where the reliability is lower than the predetermined value.

10. A road surface evaluation method, comprising:
acquiring vehicle information including information indicating a motion of a vehicle while traveling and position information of the vehicle;
acquiring map information including information on a road on which the vehicle is traveling;
deriving roughness information indicating a roughness of road surface and a reliability of the roughness information based on the vehicle information; and
outputting the roughness information and the reliability in association with the information on the road so that the narrower a width of an area representing the reliability of the roughness information, the higher an accuracy of the roughness information.

11. A road surface evaluation apparatus, comprising:
a microprocessor and a memory connected to the microprocessor, wherein
the microprocessor is configured to perform:
acquiring vehicle information including information indicating a motion of a vehicle while traveling and position information of the vehicle and map information including information on a road on which the vehicle is traveling;
deriving roughness information indicating a roughness of road surface and a reliability of the roughness information based on the vehicle information; and
outputting the roughness information and the reliability in association with the information on the road, wherein
the microprocessor is configured to perform,
when the vehicle information corresponding to a third point between a first point and a second point is not acquired, the deriving including deriving the roughness information and the reliability at the third point using the vehicle information corresponding to the first point and the second point by an interpolation.

* * * * *